(12) United States Patent
Song et al.

(10) Patent No.: US 9,925,859 B2
(45) Date of Patent: Mar. 27, 2018

(54) APPARATUS FOR CONTROLLING HYBRID VEHICLE HAVING ENGINE OIL PUMP AND METHOD THEREOF

(71) Applicants: HYUNDAI MOTOR COMPANY, Seoul (KR); KIA MOTORS CORPORATION, Seoul (KR)

(72) Inventors: Sanglok Song, Hwaseong-si (KR); Haksung Lee, Hwaseong-si (KR); Yeonho Kim, Suwon-si (KR); Jaeshin Yi, Suwon-si (KR); June Ho Lee, Seoul (KR); Gyeongcheol Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/208,868

(22) Filed: Jul. 13, 2016

(65) Prior Publication Data

US 2017/0166181 A1 Jun. 15, 2017

(30) Foreign Application Priority Data

Dec. 15, 2015 (KR) .................. 10-2015-0179139

(51) Int. Cl.
*B60W 30/194* (2012.01)
*B60K 6/48* (2007.10)
*B60W 20/50* (2016.01)

(52) U.S. Cl.
CPC ............ *B60K 6/48* (2013.01); *B60W 20/50* (2013.01); *B60W 30/194* (2013.01);
(Continued)

(58) Field of Classification Search
None
See application file for complete search history.

(56) References Cited

U.S. PATENT DOCUMENTS

2002/0091034 A1* 7/2002 Nakamori ............ B60K 6/485
477/3
2009/0242290 A1* 10/2009 Kobayashi ............ F16H 61/12
180/65.265
(Continued)

FOREIGN PATENT DOCUMENTS

JP 2011-127718 A 6/2011
JP 4737040 B2 7/2011
(Continued)

*Primary Examiner* — Justin Holmes
(74) *Attorney, Agent, or Firm* — McDermott Will & Emery LLP (57) ABSTRACT

A control apparatus of a hybrid vehicle having an electric oil pump includes an engine clutch selectively engaging an engine and a drive motor; an automatic transmission changing a power generated from the engine by engagement and releasing of a friction element into a required torque depending on a speed; a hydraulic pressure sensor sensing an oil pressure supplied to the engine clutch; a temperature sensor sensing an oil temperature discharged from the electric oil pump; a hybrid control unit (HCU) controlling the electric oil pump to selectively engage the engine clutch depending on a driving state; and a transmission control unit (TCU) controlling the electric oil pump to supply transmission control pressure to the friction element. The electric oil pump includes an oil motor and a pump to supply the operating hydraulic pressure to the engine clutch and the friction element.

11 Claims, 6 Drawing Sheets

(52) U.S. Cl.
CPC .......... *B60K 2006/4825* (2013.01); *B60W 2510/107* (2013.01); *B60W 2510/1075* (2013.01); *Y02T 10/6221* (2013.01); *Y02T 10/6252* (2013.01); *Y10S 903/902* (2013.01)

(56) References Cited

U.S. PATENT DOCUMENTS

| | | | | |
|---|---|---|---|---|
| 2011/0176932 | A1* | 7/2011 | Schultz | F16H 61/0031 417/15 |
| 2011/0276240 | A1* | 11/2011 | Fujiwara | F16H 61/0021 701/59 |
| 2012/0010044 | A1* | 1/2012 | Gibson | B60W 10/023 477/52 |
| 2012/0130576 | A1* | 5/2012 | Sugiyama | B60K 6/12 701/22 |
| 2013/0251541 | A1* | 9/2013 | Okamoto | F04B 49/06 417/32 |

FOREIGN PATENT DOCUMENTS

| | | |
|---|---|---|
| KR | 10-0774705 B1 | 11/2007 |
| KR | 10-2010-0062635 A | 6/2010 |
| KR | 10-2010-0111362 A | 10/2010 |
| KR | 10-1356175 B1 | 1/2014 |
| KR | 10-2014-0059614 A | 5/2014 |

* cited by examiner

APPARATUS FOR CONTROLLING HYBRID VEHICLE HAVING ENGINE OIL PUMP AND METHOD THEREOF

CROSS-REFERENCE TO RELATED APPLICATION

This application claims the benefit of priority to Korean Patent Application No. 10-2015-0179139 filed in the Korean Intellectual Property Office on Dec. 15, 2015, the entire content of which is incorporated herein by reference.

TECHNICAL FIELD

The present disclosure relates to a control apparatus of a hybrid vehicle having an electric oil pump and a method thereof. More particularly, the present disclosure relates to a control apparatus of a hybrid vehicle having an electric oil pump to prevent not following a target line pressure in an extremely low temperature state and a method thereof.

BACKGROUND

An automatic transmission allows a shift controller to drive a plurality of solenoid valves based on a driving speed of the vehicle, an open value of a throttle valve, and general detection conditions so as to control an oil pressure. Thus, a transmission gear of a target gear stage performs automatic shift.

An automatic transmission has an off-going element that changes from an engaged state to a released state and an on-coming element that changes from a released state to an engaged state for automatic shifting to a target shift speed. Releasing an off-going element and engaging an on-coming element is realized by controlling a hydraulic pressure supplied to respective elements.

In addition, the control of the hydraulic pressure supplied to the off-going and on-coming elements is performed by operating a control duty and controlling the solenoid valves according to the control duty.

As described above, to supply the hydraulic pressure to the automatic transmission, an oil pump is provided.

Conventionally, an oil pump system, which supplies an operating hydraulic pressure to an automatic transmission using a mechanical oil pump and an electric oil pump together, has been mainly used.

In particular, hybrid vehicles have mainly employed a control method of an oil pump system, which divides a running state of a vehicle into a stoppage section, a low-speed section, and a high-speed section, and selectively operates a mechanical oil pump and an electric oil pump.

According to the control method of the oil pump system, only the electric oil pump may be operated during the stoppage section, the mechanical oil pump and the electric oil pump may be simultaneously operated during the low-velocity section, and only the mechanical oil pump may be operated during the high-velocity section.

Recently, structures in which the mechanical oil pump, which is connected to the drive shaft of the engine, and generates power loss at all times, and causes fuel efficiency to deteriorate, is eliminated, and the electric oil pump is applied to supply oil to the automatic transmission are developed, such that revolutions per minute (RPM) of the pump is optimally controlled, thereby improving fuel efficiency.

However, when the hybrid vehicle using the electric oil pump travels in an extremely low temperature region, the hydraulic pressure discharged from the electric oil pump may do not follow a target line pressure. In this case, a motor of the electric oil pump is released, thereby a driver feels a sense of difference in the shifting.

The above information disclosed in this Background section is only for enhancement of understanding of the background of the invention, and therefore, it may contain information that does not form the prior art that is already known in this country to a person of ordinary skill in the art.

SUMMARY

An aspect of the present disclosure provides a control apparatus of a hybrid vehicle having an electric oil pump to help following a target line pressure when traveling an extremely low temperature region and a method thereof.

A control apparatus of a hybrid vehicle having an electric oil pump according to an exemplary embodiment in the present disclosure includes an engine clutch selectively engaging an engine and a drive motor; an automatic transmission changing a power generated from the engine by engagement and releasing of a friction element into a required torque depending on a speed to be output; a hydraulic pressure sensor sensing an oil pressure supplied to the engine clutch; a temperature sensor sensing an oil temperature discharged from the electric oil pump; a hybrid control unit (HCU) configured to control the electric oil pump to selectively engage the engine clutch depending on a driving state; and a transmission control unit (TCU) configured to control the electric oil pump to supply a transmission control hydraulic pressure to the friction element. The electric oil pump includes an oil motor and a pump to supply an operating hydraulic pressure to the engine clutch and the friction element. The transmission control unit determines a defect of the electric oil pump through the oil pressure sensed from the hydraulic pressure sensor and applied to the engine clutch and the oil temperature sensed from the temperature sensor to control a rotational speed of the oil motor.

The transmission control unit may increase the rotational speed of the oil motor if the hybrid control hydraulic pressure output from the HCU is larger than a reference pressure, the oil temperature sensed from the temperature sensor is lower than a reference temperature, and the target control hydraulic pressure of the hybrid control hydraulic pressure and the transmission control hydraulic pressure output from the transmission control unit is larger than the oil pressure sensed from the pressure sensor.

The transmission control unit may increase the rotational speed of the oil motor when the target control hydraulic pressure of the hybrid control hydraulic pressure and the transmission control hydraulic pressure output from the transmission control unit is larger than the oil pressure sensed from the pressure sensor by a reference amount.

The transmission control unit may increase the rotational speed of the oil motor in only case that the engine clutch is released.

The transmission control unit may increase the rotational speed of the oil motor in the case that the hybrid control hydraulic pressure is larger than a reference pressure and the oil temperature is smaller than a reference temperature during a first reference time.

The transmission control unit may increase the rotational speed of the oil motor in the case that the target control hydraulic pressure of the hybrid control hydraulic pressure and the transmission control hydraulic pressure is larger than the oil pressure during a second reference time.

A control method of a hybrid vehicle having an electric oil pump according to another exemplary embodiment in the present disclosure includes determining whether an oil temperature discharged from the electric oil pump including an oil motor and a pump is lower than a reference temperature; determining whether a hybrid control hydraulic pressure output from a HCU to engage an engine clutch is larger than a reference pressure; sensing an oil pressure supplied to the engine clutch selectively engaging the engine and the drive motor; comparing the hybrid control hydraulic pressure and a transmission control hydraulic pressure output from the transmission control unit to engage the friction element of the automatic transmission; determining whether the target control hydraulic pressure of the hybrid control hydraulic pressure and the transmission control hydraulic pressure is smaller than the oil pressure sensed from the pressure sensor; and controlling the rotational speed of the oil motor.

The rotational speed of the oil motor may be increased if the hybrid control hydraulic pressure is larger than the reference pressure, the oil temperature is lower than the reference temperature, and the target control hydraulic pressure of the hybrid control hydraulic pressure and the transmission control hydraulic pressure is larger than the oil pressure.

The control method may further include determining whether the engine clutch is engaged, and the rotational speed of the oil motor may be increased in the only case that the engine clutch is released.

The rotational speed of the oil motor may be increased when the hybrid control hydraulic pressure is larger than the reference pressure and the oil temperature is smaller than the reference temperature during the first reference time.

The rotational speed of the oil motor may be increased in the case that the target control hydraulic pressure of the hybrid control hydraulic pressure and the transmission control hydraulic pressure is smaller than the oil pressure during the second reference time.

According to the control apparatus and the method of the hybrid vehicle having the electric oil pump according the present disclosure, when the discharged flow amount (the hydraulic pressure) of the electric oil pump does not follow the target line pressure, by temporary increasing the motor rotational speed of the electric oil pump, the motor is prevented from being oscillated and the heterogeneity felt by the driver may be eliminated.

BRIEF DESCRIPTION OF THE DRAWINGS

While the drawings are described in connection with what is presently considered to be practical exemplary embodiments, it is to be understood that the invention is not limited to the disclosed drawings.

DETAILED DESCRIPTION OF THE EMBODIMENTS

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In order to clarify the present disclosure, parts that are not connected with the description will be omitted, and the same elements or equivalents are referred to as the same reference numerals throughout the specification.

The size and thickness of each element are arbitrarily shown in the drawings, and the present invention is not necessarily limited thereto, and in the drawings, the thickness of layers, films, panels, region etc., are exaggerated for clarity.

Now, a hybrid vehicle having an electric oil pump according to an exemplary embodiment will be described with reference to accompanying drawings.

Figure 1:
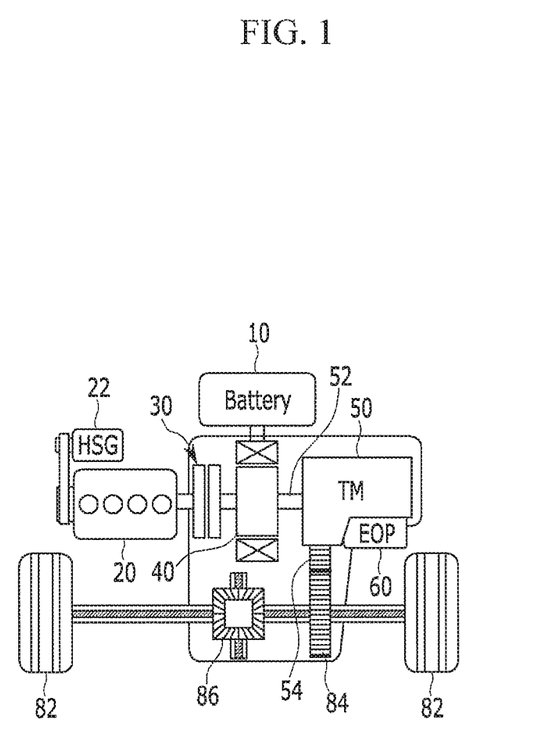
FIG. 1 is a schematic view showing a configuration of a hybrid vehicle having an electric oil pump according to an exemplary embodiment in the present disclosure.
Figure 2:
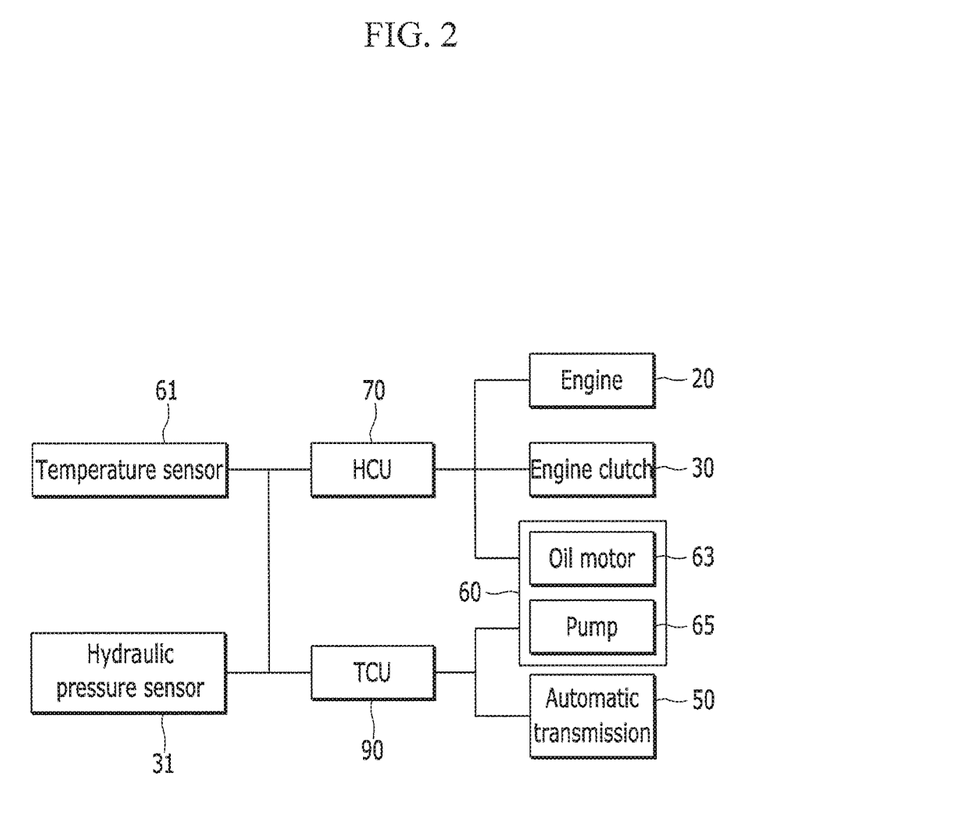
FIG. 2 is a block diagram showing a configuration of a hybrid vehicle having an electric oil pump according to an exemplary embodiment in the present disclosure.

FIG. 1 is a schematic view showing a configuration of a hybrid vehicle having an electric oil pump according to an exemplary embodiment in the present disclosure. FIG. 2 is a block diagram showing a configuration of a hybrid vehicle having an electric oil pump according to an exemplary embodiment in the present disclosure.

As shown in FIG. 1 and FIG. 2, a control apparatus of a hybrid vehicle having an electric oil pump (EOP) 60 according to an exemplary embodiment in the present disclosure includes an automatic transmission, an automatic transmission control unit (TCU) 90, a hybrid control unit (HCU) 70, and an electric oil pump (EOP). Furthermore, a power train system of the hybrid vehicle includes an engine 20, a hybrid starter and generator (HSG) 22, a motor 40, a battery 10, an engine clutch 30, an automatic transmission 50, and an axle 80.

Power transmission of the hybrid vehicle is performed as follows. Power generated from the engine 20 or the motor 40 is selectively transmitted to an input shaft 52 of the automatic transmission 50, and power output to an output stage 54 of the automatic transmission 50 is transmitted to the axle 80 through a final reduction device 84 and a differential gear device 86. Furthermore, as the axle 80 rotates wheels 82, the hybrid vehicle is operated through the power generated from the engine 20 or the motor 40.

The battery 10 supplies a power to the motor 40. The battery 10 stores a high voltage power. Furthermore, the HSG 22 operates as a motor to start the engine 20 or operates as a generator in a state where the engine 20 is driven, thereby charging the battery 10.

Furthermore, the engine clutch 30 selectively connects the engine 20 and the motor 40. That is, the powers of the engine 20 and the motor 40 are connected or blocked by the engine clutch 30.

The automatic transmission 50 changes speed by changing a gear ratio of the input shaft 52 to the output stage 54. Furthermore, the automatic transmission 50 changes speed according to operations of a plurality of friction elements 58 and 59 including one or more brakes (not illustrated) and one or more clutches (not illustrated). The plurality of friction elements 58 and 59 are operated to be coupled or decoupled by an operating hydraulic pressure supplied to the automatic transmission 50. That is, the automatic transmission 50 changes the power generated from the engine by the engagement and the releasing of the friction elements 58 and 59 into a required torque depending on the speed to be output.

Figure 4:
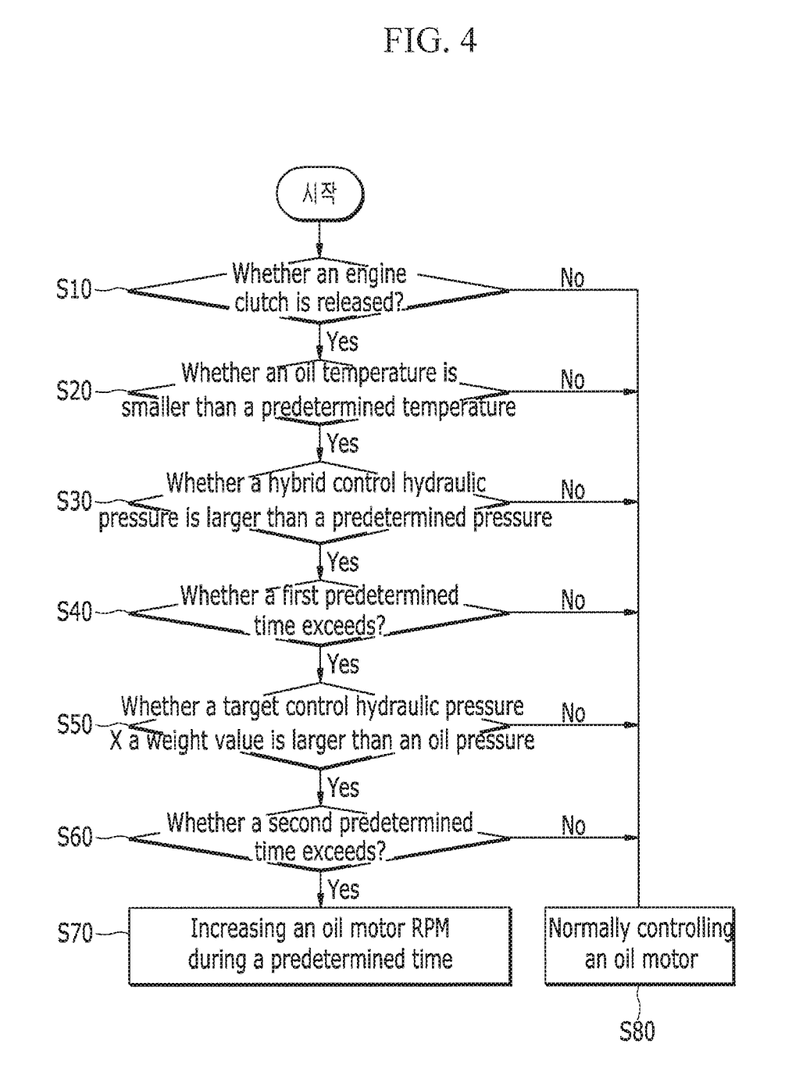
FIG. 4 is a flowchart showing a control method of a hybrid vehicle having an electric oil pump according to an exemplary embodiment in the present disclosure.

For example, as shown in FIG. 4, the friction elements 58 and 59 (e.g., a clutch) receive the hydraulic pressure from the EOP 60 including the motor 210 and the pump 220 through an actuator 67 (e.g., a solenoid valve). Here, the actuator 67 controls the hydraulic pressure discharged from the pump to engage or release the friction elements 58 and 59. The actuator 67 includes at least one control valve and solenoid valve controlling the hydraulic pressure applied to the on-coming friction element 59 and the out-going friction element 58.

The TCU 90 is a device controlling a torque of the automatic transmission 50 and operations of the friction elements 58 and 59.

The EOP 60 appropriately supplies the operating hydraulic pressure operating the friction elements 58 and 59 of the automatic transmission 50. Further, the EOP 60 supplies the operating hydraulic pressure operating the engine clutch 30. That is, the hydraulic pressure discharged from the EOP 60 operates the friction elements 58 and 59 of the automatic transmission 50, and the hydraulic pressure passing through the automatic transmission 50 is supplied to the engine clutch 30.

The operating hydraulic pressure to operate the engine clutch 30 is controlled through the HCU 70, and the operating hydraulic pressure to operate the friction elements 58 and 59 of the automatic transmission 50 is controlled through the TCU 90. That is, the hydraulic pressure (flow rate) discharged from the EOP 60 is controlled through the cooperative control of the HCU 70 and the TCU 90. The HCU 70 and the TCU 90 may transmit and receive various information through a CAN communication.

In the present specification, a command controlling the EOP 60 to engage or release the engine clutch 30 from the HCU 70 is referred to as a hybrid control hydraulic pressure, and a command controlling the EOP 60 to engage or release the friction elements 58 and 59 of the automatic transmission 50 from the TCU 90 is referred to as a transmission control hydraulic pressure.

Figure 3:
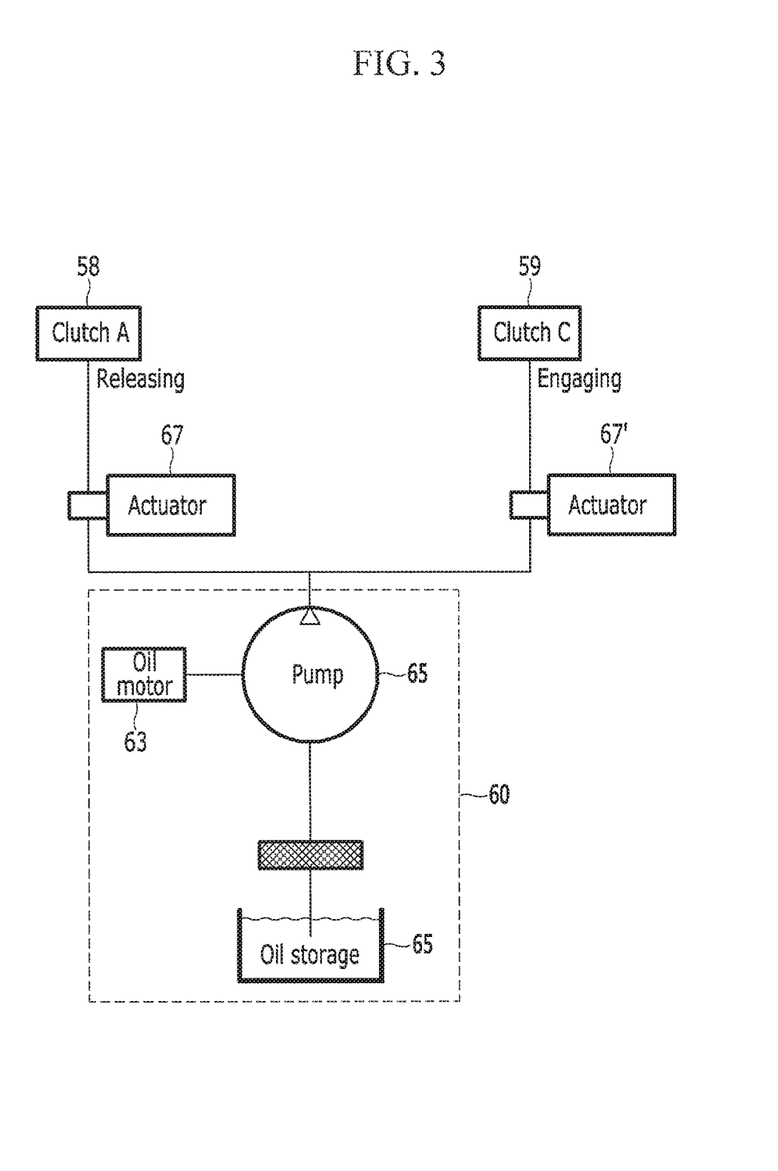
FIG. 3 is a schematic view showing a structure of an electric oil pump according to an exemplary embodiment in the present disclosure.

The EOP 60 includes an oil motor 63 and a pump 65 and supplies the operating hydraulic pressure to the engine clutch 30 and the friction elements 58 and 59 of the automatic transmission 50. The HCU 70 and the TCU 90 control a rotational speed (RPM) of the oil motor 63 to control the operating hydraulic pressure discharged from the pump 65.

The hydraulic pressure discharged from the EOP 60 is supplied to the engine clutch 30 through the friction elements 58 and 59 of the automatic transmission 50. In this case, the oil pressure formed in the passage of the friction elements 58 and 59 of the automatic transmission 50 from the pump 65 is referred to as a line pressure. The line pressure is controlled by the TCU 90.

In this case, if the hybrid control hydraulic pressure to control the engine clutch 30 is larger than the transmission control hydraulic pressure to control the friction elements 58 and 59, the hydraulic pressure supplied to the engine clutch 30 is output by a magnitude of the transmission control hydraulic pressure.

That is, since the EOP 60 is operated by the cooperative control of the HCU 70 and the TCU 90, the hydraulic pressure discharged from the EOP 60 is determined as a target control hydraulic pressure of the hybrid control hydraulic pressure and the transmission control hydraulic pressure.

The control apparatus of the automatic transmission having the electric oil pump according to the present disclosure includes a hydraulic pressure sensor 31 sensing the oil pressure supplied to the engine clutch and a temperature sensor 61 sensing an oil temperature discharged from the EOP 60. The oil pressure sensed from the hydraulic pressure sensor 31 and the oil temperature sensed from the temperature sensor 61 are transmitted to the HCU 70 and the TCU 90.

The HCU 70 and the TCU 90 may be provided of at least one processor operated by a predetermined program, and the predetermined program executes each step of the control method of the automatic transmission having the electric oil pump according to the present disclosure.

The TCU 90 determines a defect of the EOP 60 from the oil pressure sensed from the hydraulic pressure sensor 31 and applied to the engine clutch and the oil temperature sensed from the temperature sensor 61 and controls the rotational speed of the oil motor.

If the hybrid control hydraulic pressure output from the HCU 70 is larger than a reference pressure (for example, 6 bar), the oil temperature sensed from the temperature sensor 61 is lower than a reference temperature (for example, −10° Celsius), and the target control hydraulic pressure of the hybrid control hydraulic pressure and the transmission control hydraulic pressure is larger than the oil pressure sensed from the pressure sensor, the TCU 90 increases the rotational speed of the oil motor by a reference speed rather than rotational speed of the oil motor in a normal state.

The reference pressure (for example, 6 bar) may be a minimum hydraulic pressure to slip or lock-up of the engine clutch 300. Accordingly, when the hybrid control hydraulic pressure is smaller than the reference pressure (for example, 6 bar), since the engine clutch 30 is not slipped or engaged, the magnitude of the hybrid control hydraulic pressure is compared with the reference pressure. To compare the oil temperature with the reference temperature is to determine whether the vehicle travels the low temperature province.

In this case, when the condition that the hybrid control hydraulic pressure is larger than the reference pressure and the oil temperature is lower than the reference temperature is maintained during a first reference time (for example, 1 second) and the condition that the target control hydraulic pressure is larger than the oil pressure is maintained during a second reference time (for example, 0.5 seconds), the TCU 90 increases the rotational speed of the oil motor.

That is, when the condition is satisfied during the reference times, it is determined that a temporary problem is generated in the electric oil pump.

A value that a reference amount (for example, 0.5) is multiplied to the target control hydraulic pressure is larger than the oil pressure sensed from the pressure sensor, the TCU 90 may increase the rotational speed of the oil motor by a reference speed rather than the rotational speed of the oil motor in the normal state.

As described above, the hydraulic pressure discharged from the electric oil pump is controlled to the target control hydraulic pressure, in this case, if the oil pressure of the pressure sensor is smaller than the target control hydraulic pressure, it may be determined that the problem is generated in the electric oil pump.

Accordingly, in this case, by increasing the rotational speed of the oil motor by the reference speed, the oil pump may be prevented from being oscillated.

When the engine clutch 30 is no engaged (the engine clutch is released), the TCU 90 may increase the rotational speed of the oil motor.

That is, although the problem is generated in the electric oil pump such that the discharge hydraulic pressure (the flow amount) of the electric oil pump does not flow the target line pressure, if the engine clutch 30 is engaged, the problem that the oil motor 63 or the engine 20 are oscillated is not generated. Accordingly, if the only case that the engine clutch 30 is not engaged, the rotational speed of the oil motor 63 may increase.

Hereinafter, a control method of the automatic transmission having the electric oil pump according to an exemplary embodiment will be described with reference to accompanying drawings.

Figure 5A:
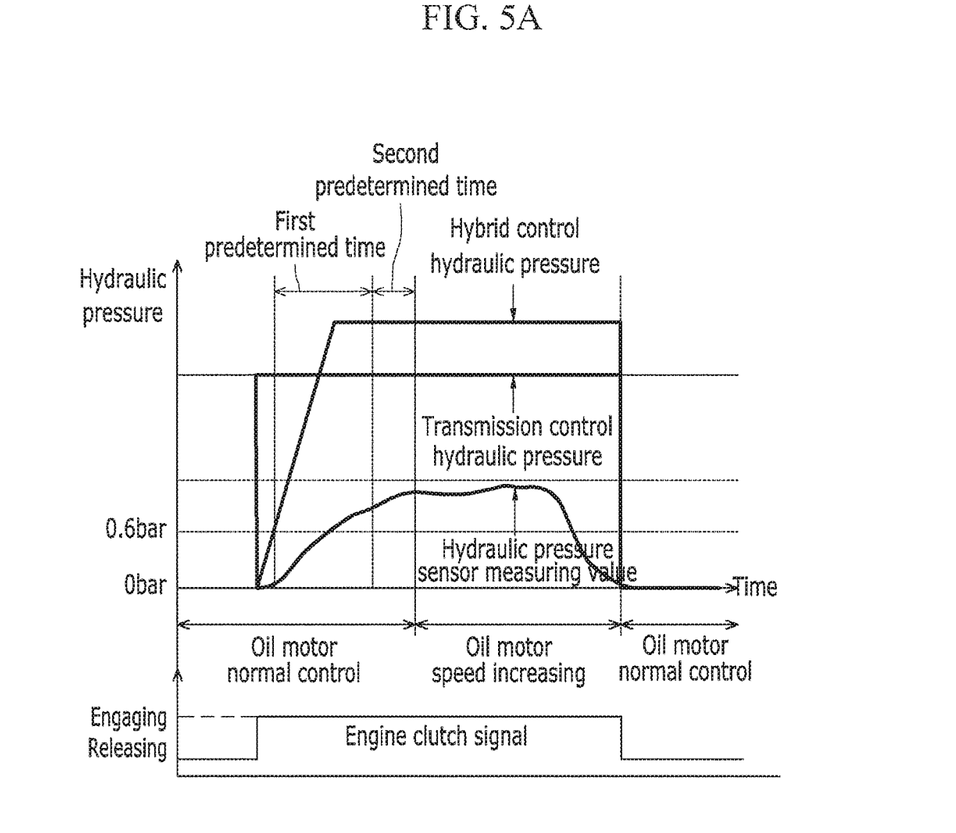
FIG. 5A and FIG. 5B are graphs showing a control signal according to an exemplary embodiment in the present disclosure.
Figure 5B:
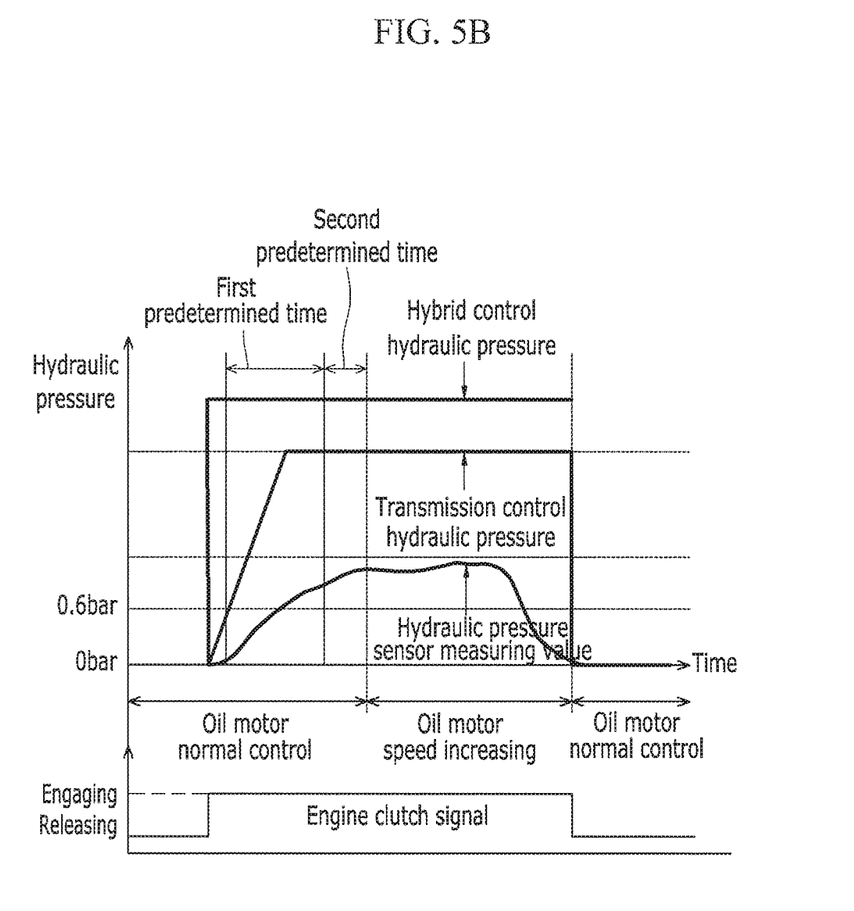

FIG. 4 is a flowchart showing a control method of a hybrid vehicle having an electric oil pump according to an exemplary embodiment in the present disclosure. FIG. 5A and FIG. 5B are graphs showing a control signal according to an exemplary embodiment in the present disclosure.

As shown in FIG. 4, the TCU 90 determines whether the engine clutch is in a released state (S10).

The TCU 90 determines whether the oil temperature discharged in the EOP 60 sensed from the temperature sensor 61 is smaller than the reference temperature (S20).

The TCU 90 determines whether the hybrid control hydraulic pressure is larger than a reference pressure (for example, 0.6 bar) (S30) and determines whether a condition in the step (S10), a condition of the step (S20), and a condition of the step (S30) are satisfied and each condition is maintained during a first reference time (S40).

Further, the TCU 90 determines whether a target control hydraulic pressure of the hybrid control hydraulic pressure and the transmission control hydraulic pressure is larger than the oil pressure sensed from the pressure sensor (S50). In this case, whether or not a value that a reference weight value (for example, 0.5 Kg) is multiplied to the target control hydraulic pressure is larger than the oil pressure may be determined.

FIG. 5A shows a case in which the hybrid control hydraulic pressure is larger than the transmission control hydraulic pressure. In this case, the transmission control hydraulic pressure becomes the target control hydraulic pressure. FIG. 5B shows a case in which the hybrid control hydraulic pressure is smaller than the transmission control hydraulic pressure. In this case, the hybrid control hydraulic pressure becomes the target control hydraulic pressure.

The TCU 90 determines whether a condition of the step (S50) is maintained during a second reference time (S60).

If the second reference time exceeds in the step (S60), the TCU 90 increases a rotational speed of the oil motor by a reference speed (S70).

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A control apparatus of a hybrid vehicle having an electric oil pump, the control apparatus comprising:
    an engine clutch selectively engaging an engine and a drive motor;
    an automatic transmission changing a power, which is generated from the engine by engagement and releasing of a friction element, into a required torque depending on a speed;
    a hydraulic pressure sensor sensing an oil pressure supplied to the engine clutch;
    a temperature sensor sensing a temperature of oil that is discharged from the electric oil pump;
    a hybrid control unit (HCU) configured to control the electric oil pump to selectively engage the engine clutch depending on a driving state by outputting a hybrid control hydraulic pressure; and
    a transmission control unit (TCU) configured to control the electric oil pump to supply a transmission control hydraulic pressure to the friction element,
    wherein the electric oil pump includes an oil motor and a pump to supply an operating hydraulic pressure to the engine clutch and the friction element, and
    wherein the TCU determines a defect of the electric oil pump through the oil pressure, which is sensed from the hydraulic pressure sensor and applied to the engine clutch, and the oil temperature, which is sensed from the temperature sensor, to control a rotational speed of the oil motor.

2. The control apparatus of claim 1, wherein the TCU increases the rotational speed of the oil motor the transmission control unit increases the rotation speed of the oil motor,
    wherein when the hybrid control hydraulic pressure is higher than a reference pressure, the oil temperature sensed from the temperature sensor is lower than a reference temperature, and
    wherein a target hydraulic pressure of the hybrid control hydraulic pressure and the transmission control hydraulic pressure is higher than the oil pressure sensed from the hydraulic pressure sensor.

3. The control apparatus of claim 2, wherein the TCU increases the rotational speed of the oil motor when the target control hydraulic pressure is higher than the oil pressure sensed from the pressure sensor by a reference amount.

4. The control apparatus of claim 2, wherein the TCU increases the rotational speed of the oil motor only when the engine clutch is released.

5. The control apparatus of claim 2, wherein the TCU increases the rotational speed of the oil motor when the hybrid control hydraulic pressure is higher than the reference pressure and the oil temperature is lower than a reference temperature during a first reference time.

6. The control apparatus of claim 2, wherein the TCU increases the rotational speed of the oil motor when the target control hydraulic pressure is higher than the oil pressure during a second reference time.

7. A control method of a hybrid vehicle having an electric oil pump, the control method comprising steps of:
    determining, by a transmission control unit (TCU), whether a temperature of oil discharged from the electric oil pump, which includes an oil motor and a pump, is lower than a reference temperature;
    when it is determined that the temperature of oil is lower than the reference temperature, determining, by a hybrid control unit (HCU), whether a hybrid control hydraulic pressure, which is outputted from the HCU to engage an engine clutch, is higher than a reference pressure;
    when it is determined that the hybrid control hydraulic pressure is higher than the reference pressure, sensing, by a hydraulic pressure sensor, an oil pressure supplied to the engine clutch for selectively engaging an engine and a drive motor;

comparing, by the HCU, the hybrid control hydraulic pressure and a transmission control hydraulic pressure which is outputted from the TCU to engage the friction element of the automatic transmission;

when it is determined that the hybrid control hydraulic pressure is higher than the transmission control hydraulic pressure, determining, by the HCU, whether a target control hydraulic pressure of the hybrid control hydraulic pressure and the transmission control hydraulic pressure is lower than the oil pressure that is sensed from the pressure sensor; and controlling, by the TCU, a rotational speed of the oil motor according to a result of the step of determining the target control hydraulic pressure and the transmission control hydraulic pressure.

8. The control method of claim 7, wherein the rotational speed of the oil motor increases when:

the hybrid control hydraulic pressure is higher than the reference pressure;

the oil temperature is lower than the reference temperature; and the target control hydraulic pressure of the hybrid control hydraulic pressure and the transmission control hydraulic pressure is higher than the oil pressure.

9. The control method of claim 7, further comprising:

after controlling the rotational speed of the oil motor, determining whether the engine clutch is engaged; and increasing the rotational speed of the oil motor only when the engine clutch is released.

10. The control method of claim 7, wherein the rotational speed of the oil motor increases when the hybrid control hydraulic pressure is higher than the reference pressure and the oil temperature is lower than the reference temperature during the first reference time.

11. The control method of claim 7, wherein the rotational speed of the oil motor increases when the target control hydraulic pressure of the hybrid control hydraulic pressure and the transmission control hydraulic pressure is lower than the oil pressure during the second reference time.

* * * * *